Figure 4:
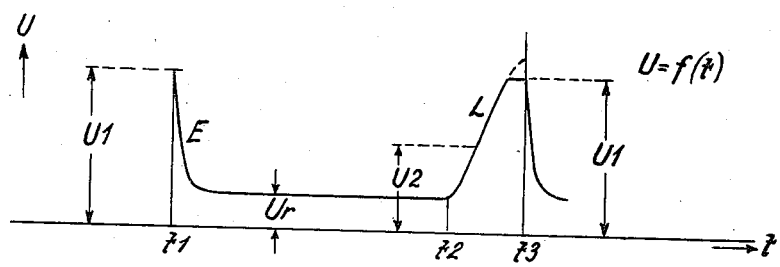

Inventor:
Ernst Müller

April 25, 1939.  E. MÜLLER  2,156,061

SYSTEM FOR DETERMINING POSITIONS BY RADIO BEACONS

Filed Dec. 17, 1936  2 Sheets-Sheet 1

Inventor:
Ernst Müller
by R. C. Hopgood
Attorney

Patented Apr. 25, 1939

2,156,061

UNITED STATES PATENT OFFICE 2,156,061

SYSTEM FOR DETERMINING POSITIONS BY RADIO BEACONS

Ernst Müller, Berlin-Tempelhof, Germany, assignor to C. Lorenz Aktiengesellschaft, Berlin-Tempelhof, Germany, a company Application December 17, 1936, Serial No. 116,335
In Germany December 20, 1935

7 Claims. (Cl. 250—11)

The present invention relates to new and useful improvements in systems for determining the bearing of a movable aircraft, vessel or the like, with respect to a radio transmission station of the rotary beacon type.

In the non-rotary beacon type of radio transmitting station, the radiation pattern has a fixed center line extending through the radio station. Two different signals are directively radiated in such a manner that one of these signals predominates on one side of said center line and the other on the other side of said center line. The signals are of equal intensity on the center line.

Ordinarily these two different signals consist of complementary codes, such as A and N (dot-dash and dash-dot, respectively), or simply dots for the signals on one side of the center line and complementary dashes for the signals on the other side of the center line. If the dots, which compose one signal, are truly complementary to the dashes which compose the other signal, a continuous dash signal will be heard along the center line when both signals are of equal intensity.

In rotary beacons the radiation pattern is sometimes produced in the same manner as in non-rotary beacons. However, the entire radiation pattern is rotated so that the center line of equal intensity reception of the two signals constantly rotates, and in which the regions of predominant dot-signals and predominant dash-signals correspondingly rotate.

Such rotary beacons also transmit in addition to the rotating radiation pattern consisting of two signals transmitted with different directional characteristics, a non-directional signal which is employed for synchronizing or timing purposes. This impulse is transmitted in all directions at the instant when the center line of the rotating radiation pattern passes through a given direction.

The method hitherto employed of determining the bearing of a movable craft with respect to such a rotary beacon was as follows: The non-directional signals forming the rotating radiation pattern were both received at the moving craft and the elapsed time between the reception of the non-directional signal and the moment when the center line of the rotating radiation pattern reached the craft was measured by a stop watch or other means. In order to facilitate the measurement of this time interval it has been suggested that the number of signals, e. g., the number of dots and dashes transmitted from the beacon per second, should be definitely related to the rate of rotation of the rotating radiation pattern of this beacon so that, for instance, fifteen dots and dashes will be transmitted during each quadrant of rotation, or one signal for each six degrees of rotation.

In the patent application Serial No. 17,034, filed April 18, 1935, in the name of E. Kramar for "Methods for determining positions by radio beacons", a push-pull arrangement is disclosed which comprises grid-controlled discharge tubes for counting impulses received for obtaining bearings or determining the position in cooperation with the above described transmitter.

The present invention is an improvement upon the push-pull arrangement above referred to and consists in certain features of novelty which will appear from the following description and which will be particularly pointed out in the appended claims, reference being had to the accompanying drawings in which.

Figure 5:
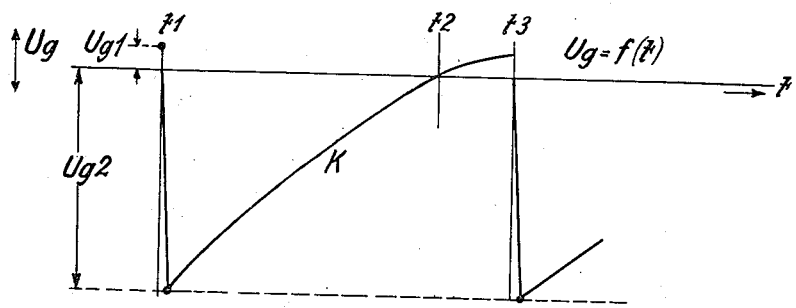
Figure 6:
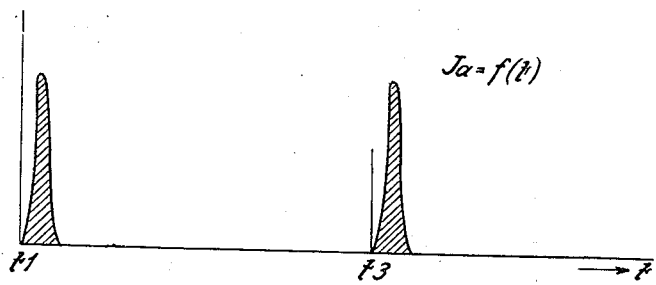
Figure 1:
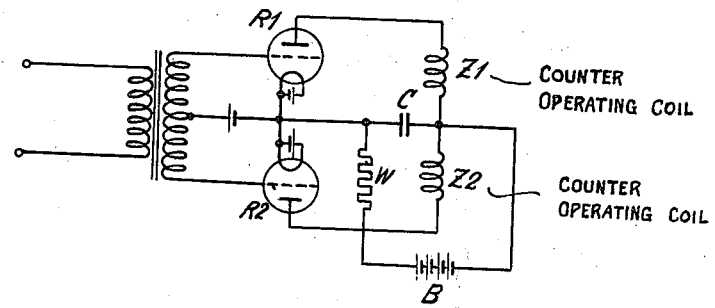
Figure 2:
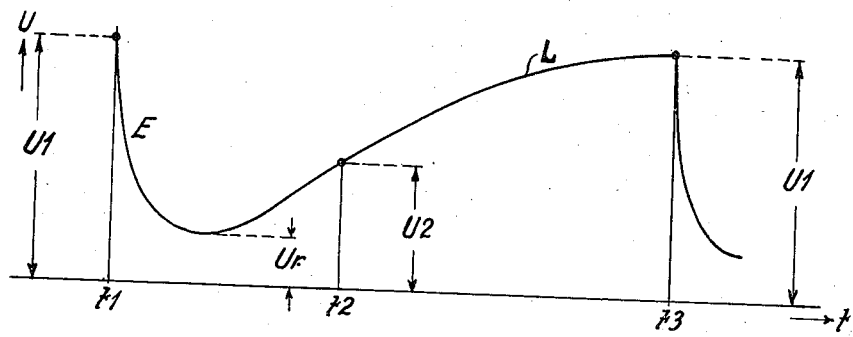
Figure 3:
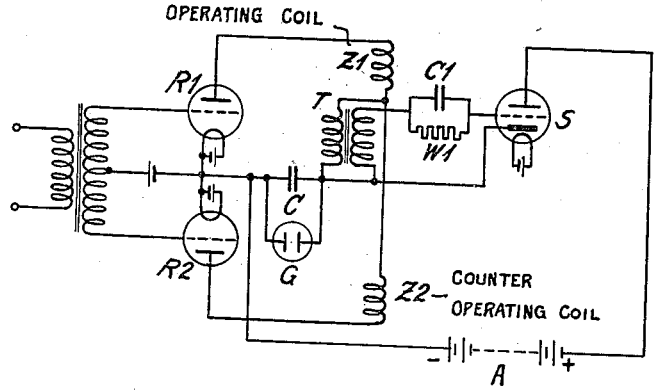

Fig. 1 is a wiring diagram of a known push-pull arrangement of tubes which is intended to cooperate with radio beacons of the kind referred to. Fig. 2 is a graphic representation that serves to explain some disadvantages of this arrangement. Fig. 3 is the wiring diagram of the novel push-pull arrangement of tubes. Figs. 4, 5, 6 are graphic representations illustrating the operation of the novel arrangement.

The arrangement shown in Fig. 1 comprises two push-pull tubes R1, R2, connected to a rectifier (not shown) over a transformer, which is associated with a receiver employed for picking up radio beacon signals, two counting mechanisms Z1, Z2 to be actuated by these tubes, a condenser C included in the anode circuit, common to the tubes R1, R2, an anode battery B, and a resistance W over which the condenser C is to be charged.

As described in the said patent application Ser. No. 17,043, the tubes R1, R2 each respond to one of the two impulses which belong to each signal, such impulses being caused by the current variation that occurs at the commencement of the signal and at the end thereof. The arrangement is such that only the first impulse, by which the kind of signal is determined, shall act on the tubes, whereas the second impulse is suppressed. This is accomplished by the first impulse acting to discharge the condenser C while the second impulse can not become active because at that moment the tubes have no anode potential.

The time constant C, W is so chosen that the condenser C, discharged by the first impulse which, for instance, is positive and occurs at the commencement of the signal, shall be free of potential (except for a slight remainder) when at the end of the signal the second, negative impulse originates, and that it shall have been completely recharged when the next following positive impulse occurs, so that the arrangement then is again able to respond. In arrangements of this kind which have been installed the interval between a negative impulse and the next following positive impulse is about seven times as long as the interval between the first positive and the next following negative impulse.

In accordance with the invention condenser C is quickly recharged just an instant before the arrival of the impulses and is thus maintained discharged during the longest part of the time intervening between two positive impulses, except for a slight amount of voltage that will remain in the condenser.

If in the arrangement shown in Fig. 1 the speed at which signals succeed one another is increased, then the time constant of the condenser-resistance combination C, W can no longer be made small enough. This is due to the fact that condenser C while becoming discharged is also recharged by battery B. Resistance W might be made very small in order to obtain a sufficiently small time constant. However, then the voltage supplied by battery B during the discharge of condenser C would, at a quick succession of the signals, cause the tubes R1, R2 to respond permanently. Furthermore, by making the condenser too small the discharge energy would likewise be too small at a given voltage.

Disturbing impulses of sufficiently large amplitude may actuate the arrangement if the condenser has been charged for a long time before the arrival of a positive impulse. This will be clear from Fig. 2. Here the potential U at the condenser C is plotted with respect to the time $t$. Before the arrival of the first positive impulse the condenser has the potential $U1$. At the instant $t1$ when the first impulse arrives one of the tubes R1, R2 will respond and condenser C will discharge as illustrated by curve E, except for a remainder of potential $Ur$ to which these tubes do not respond however. The potential at condenser C now increases again at a rate determined by the time constant C, W, as shown by curve L. If the tubes respond, for instance, to the potential $U2$, then a disturbing impulse occurring at the instant $t2$ may actuate one of the counters Z1, Z2 and thus bring about a wrong counting. The region in which the arrangement is liable to disturbances is thus located between points $t2$ and $t3$. Attempts have been made to limit as far as possible the region within which the device may be subject to disturbances. For instance, care may be taken to quickly recharge the condenser just before the arrival of the second impulse so that it shall be without potential as long as possible between $t1$ and $t3$.

In order to charge the condenser C in this manner, an additional electronic tube S is employed as shown in Fig. 3. This tube is controlled by the impulses themselves and acts to prevent condenser C from receiving a charging voltage as long as it is being discharged.

Included in the anode circuit common to the push-pull-tubes R1, R2, Fig. 3, and connected in series with the condenser C is the primary of a transformer T whose secondary is attached to the grid of the control tube S over a condenser C1 and a resistance W1 connected in parallel with each other. Condenser C is charged by the anode current of the tube S.

Let us assume that the condenser C is charged. On the arrival of a positive impulse one of the tubes R1, R2 responds, for example tube R1. Condenser C discharges over the primary of the transformer T and causes the counter Z1 to become active. The current impulse produced by the discharge of condenser C will abruptly impress a negative charge on the grid of the tube S whereby tube S becomes blocked. This will interrupt the charging circuit of the condenser C. The negative charge of the grid leaks off over the grid leak C1, W1 and the secondary of the transformer T to the cathode at a rate determined by the time constant C1, W1. The time constant C1, W1 is so chosen that just before the arrival of the next following impulse this grid charge shall have completely leaked off, the potential on the grid then being of zero value. An anode current now flows through tube S, and condenser C is thus suddenly recharged. This action recurs on the arrival of the next following impulse. On receipt of a signal of another kind, a reversed impulse, i. e., a negative impulse is set up which causes the response of the tube R2 and the operation of the counting mechanism Z2. The functions of tube S and condenser C are the same since both are included in the same part of the anode circuit.

Fig. 4 illustrates the course of the potential produced at condenser C of the novel arrangement. The potential U at condenser C is here plotted with respect to the time $t$. $U1$ is the potential at the condenser which on the arrival of an impulse decreases in the manner represented by curve E. Curve E is considerably steeper and a sharper bend below than has the curve shown in Fig. 2. This is due to the charging circuit being blocked up during the discharge of condenser C, which is not the case in the arrangement shown in Figs. 1 and 2. In the condenser a potential $Ur$ remains to which the push-pull tubes do not respond. Just before the arrival of the second impulse, i. e. at the instant $t2$, the recharging of the condenser begins and is completed as indicated by curve L. To insure a constant potential whenever an impulse arrives, the charge of the condenser is limited by a glow discharge tube G connected in parallel with C, so that the potential at C shall not be of the magnitude indicated by the dotted portion of the charging curve L, as would be the case without the aid of the tube G, but shall be constant from a predetermined potential $U1$ onward. At the instant $t3$, when the next following impulse arrives, this action recurs.

Below Fig. 4, in which $U=f(t)$, the potential $Ug$ on the grid of the control tube S is in Fig. 5 plotted as a function of the time $t$. At the instant $t1$ the grid will have a slight positive potential $Ug1$. By the sudden discharge of the condenser C the grid is given a negative bias which we will assume attains the value $Ug2$. The negative charge leaks off at a rate determined by the time constant C1, W1, that is to say, the potential on the grid becomes more positive as indicated by curve K, and it does so until the instant $t2$, when it attains zero value. At this moment the condenser begins to be recharged in the manner represented in Fig. 4. From value $t3$ onward the grid potential again becomes negative until value $Ug2$ is reached.

Fig. 6 illustrates the dependence of the anode current $Ja$ of the tubes R1, R2 upon the time $t$. The anode current at first increases in consequence of the self-induction of the primary of the transformer T and in consequence also of the self-induction of the counters Z1, Z2, as indicated by a short curvature, and then steeply ascends to its maximum value, whereupon it abruptly decreases as represented by the discharge curve E of the condenser. The hatched areas in Fig. 6 represent the quantity of electricity stored up in condenser C. The object is to make the anode current curve as steep and narrow as possible in order to ensure that the counters shall be actuated in a reliable manner.

This arrangement thus acts greatly to diminish the region liable to disturbances. This region is now located within a space of time which is slightly smaller than that indicated by $t2$ and $t3$, because there is a definite value of the potential to which the push-pull tubes shall respond, such for example as value $U2$ in Fig. 4. The operation of the arrangement depends upon the increase in voltage at condenser C, such increase having to be as quick as possible, and also depends upon the time constant of the condenser-resistance combination $C1$, $W1$ of the tube S, this time constant determining the instant at which the condenser begins to be recharged.

Arrangements as provided by the invention thus solve the problem in question. Owing to the charging circuit being blocked up during the response of the push-pull tube arrangement the speed of succession of signals may be increased and thus a greater accuracy in determining position be obtained. By condenser C remaining discharged as long as possible between two impulses of the same direction the liability to disturbances is greatly diminished so as to avoid wrong indications.

What is claimed is:

1. A counting device for counting signals of different kinds, said counting device comprising a radio signal receiver containing the following instrumentalities; means for separately counting said signals, electronic discharge tubes in push-pull connection, a condenser in an anode circuit common to said tubes, circuit connections to discharge the condenser by received signals, an electronic control tube to control the charging of the condenser, and means for influencing said control tube by the condenser discharge impulses.

2. A counting device as defined in claim 1, having means provided in said radio signal receiver for influencing said control tube by the discharge impulses from said condenser, said means comprising a transformer adapted to transmit the condenser discharge impulses from said condenser to said control tubes.

3. A counting device as defined in claim 1, having means provided in said radio signal receiver for influencing said control tube by the discharge impulses from said condenser, said means comprising a condenser-resistor system adapted to transmit the condenser discharge impulses from said condenser to said control tubes.

4. A counting device according to claim 1 in which said receiver has means to actuate said control tube by the discharge impulse of the condenser, and a grid leak is provided comprising a condenser and resistance in parallel with each other and connected in the grid circuit of said control tube.

5. A counting device according to claim 1 wherein the receiver has means to actuate said control tube by the discharge impulse of the condenser and a grid leak comprising a condenser and resistance in parallel is connected to the grid circuit of said control tube whereby the commencement of charging of the first-mentioned condenser in the anode circuit common to the discharge tubes depends upon the time constant of said grid leak.

6. A counting device according to claim 1 in which the receiver has means to actuate said control tube by the discharge impulse of the condenser, and there is provided a grid leak comprising a condenser and resistance connected in parallel in the grid circuit of said control grid, and means are also provided for limiting and maintaining constant the potential produced at the first-mentioned condenser included in the anode circuit common to the push-pull tubes.

7. A counting device according to claim 1 in which the receiver has means to actuate said control tube by the discharge impulse of said condenser, and there is provided a grid leak comprising a condenser and resistance connected in parallel in the grid circuit of the control tube, and there is also provided a glow discharge tube connected in parallel with the first-mentioned condenser in the anode circuit common to the push-pull tubes.

ERNST MÜLLER.